United States Patent [19]

Nakane et al.

[11] Patent Number: 5,180,334
[45] Date of Patent: Jan. 19, 1993

[54] TORQUE VARIATION ABSORBING DEVICE PROVIDED WITH ELASTIC ELEMENTS AND GROOVED PLATES FOR RECEIVING ROTATIONAL ELEMENTS

[75] Inventors: Mototaka Nakane, Toyota; Kiyonori Kobayashi, Chiryu, both of Japan

[73] Assignee: Aisin Seiki Kabushiki Kaisha, Kariya, Japan

[21] Appl. No.: 748,259

[22] Filed: Aug. 21, 1991

[30] Foreign Application Priority Data

Aug. 31, 1990 [JP] Japan .................. 2-228339

[51] Int. Cl.⁵ .......................... F16D 3/14; F16D 3/76; F16D 7/06
[52] U.S. Cl. .......................................... 464/35; 464/89
[58] Field of Search ............... 464/30, 34, 35, 51, 464/82, 83, 87, 89, 90; 192/106.1; 74/574

[56] References Cited

U.S. PATENT DOCUMENTS

| | | | |
|---|---|---|---|
| 4,485,906 | 12/1984 | Lutz et al. | 192/106.1 |
| 4,572,344 | 2/1986 | Horiuchi et al. | 192/106.1 |
| 4,790,791 | 12/1988 | Sumida et al. | 74/574 X |
| 4,800,996 | 1/1989 | Loizeau | 192/106.1 |
| 4,850,244 | 7/1989 | Eckel et al. | 464/89 X |

FOREIGN PATENT DOCUMENTS

| | | |
|---|---|---|
| 611897 | 4/1935 | Fed. Rep. of Germany . |
| 3529274A1 | 2/1987 | Fed. Rep. of Germany . |
| 3839468A1 | 5/1990 | Fed. Rep. of Germany . |
| 1054604 | 2/1954 | France . |
| 56-43176 | 10/1981 | Japan . |
| 59-62724 | 4/1984 | Japan . |

Primary Examiner—Daniel P. Stodola
Assistant Examiner—William G. Battista, Jr.
Attorney, Agent, or Firm—Burns, Doane, Swecker & Mathis

[57] ABSTRACT

A torque variation absorbing device comprises a driving plate, a flywheel which is rotatable relative to the driving plate through a bearing element in common axis, an elastic member which is disposed in a space defined between the driving plate and the flywheel, an inner peripheral portion of the elastic member secured to either the driving plate or the flywheel, and an outer peripheral surface corresponding to an inner peripheral surface of the other, a plate secured to an outer peripheral surface of the elastic member so as to correspond to the inner peripheral surface, a plurality of rotational members which are rotatably disposed between the plate and the inner peripheral surface in the circumferential direction in such a manner that each rotational member is depressed by the elastic force of the elastic member, and a clearance which is defined between the plate and the inner peripheral surface, and narrows toward both ends of the plate from a center of the plate so as to obtain a large relative angle of torsion and to improve performance during high speed rotation.

6 Claims, 4 Drawing Sheets

TORQUE VARIATION ABSORBING DEVICE PROVIDED WITH ELASTIC ELEMENTS AND GROOVED PLATES FOR RECEIVING ROTATIONAL ELEMENTS

BACKGROUND OF THE INVENTION

1. Field of the Invention

This invention relates to a torque variation absorbing device for use in an automotive vehicle or other vehicles, and more particularly relates to a torque variation absorbing device which is applied to an engine.

2. Description of the Related Art

Japanese Patent Publication No. 43176/1981 (Japanese Patent Laid-Open No. 20930/1980) discloses a conventional torque variation absorbing device. The device includes, as shown in FIGS. 4 and 5, a plurality of coil springs 3 which are disposed between a driving plate 1 and a flywheel 2 in the circumferential direction. The device transmits a torque from the driving plate 1 to the flywheel 2 through the coil springs 3. Moreover, the device absorbs a torque variation by operation of the coil springs 3 for accumlating or releasing a rotational energy according to a relative rotation between the driving plate 1 and the flywheel 2. As a result, vibrations of a vehicle caused by the torque variation can be reduced.

It is generally well-known that the torque variation absorbing ability becomes more effective as the torsional rigidity is made less small. In this case, torsional rigidity is a coefficient which is represented by the relationship between the transmitting torque and the relative angle of torsion between the driving plate 1 and the flywheel 2. Thus, the torque variation absorbing ability depends on the relative angle of torsion between the driving plate 1 and the flywheel 2.

However, in the foregoing device, the relative angle of torsion between the driving plate 1 and the flywheel 2 is determined by the allowable stress or deflection of the coil spring 3 and position of the coil springs 3 in the device. Therefore, it is difficult to obtain a large relative angle of torsion due to the abovementioned design restrictions.

In order to solve the abovementioned restrictions, Japanese Patent Laid-Open No. 62724/1984 discloses another conventional torque variation absorbing device. The device includes, as shown in FIG. 6, a plurality of elastic members 7 which are rotatably disposed between the outer surface of a driven hub 5 and the inner surface of a driving plate 6. The outer surface of the driven hub 5 has a polygonal shape, whereas, the inner surface of the driving plate 6 has a circular shape. Therefore, the elastic member 7 is elastically and rotatably compressed between the outer surface and the inner surface by a relative rotation therebetween. As a result, the device transmits a torque from the driving plate 6 to the driven hub 5 by a reaction force of the elastic member 7.

However, in this foregoing device, the elastic member 7 cannot transform to a great extent when a large torque is applied, because the position of the reaction force acting on the elastic member 7 is changed by the rotation of itself. As a result, the device cannot transmit large torques. Also, the elastic member 7 easily wears due to the rotation of itself. Therefore, the reaction force becomes small in a short period of time. As a result, the device cannot transmit enough torque for a long period of time. Further, during high speed rotation, the reaction force is decreased by a centrifugal force acting on the elastic member 7. Therefore, the transmitting torque decreases. Thus, the torque transfer efficiency decreases.

SUMMARY OF THE PRESENT INVENTION

It is a primary object of the invention to provide an improved torque variation absorbing device which obviates the above-described drawbacks.

It is another object of the invention to provide a torque variation absorbing device which is simple and low in cost.

It is still another object of the invention to provide a torque variation absorbing device which is prevented from making noise.

DETAILED DESCRIPTION OF PREFERRED EMBODIMENT OF THE INVENTION

Figure 1:
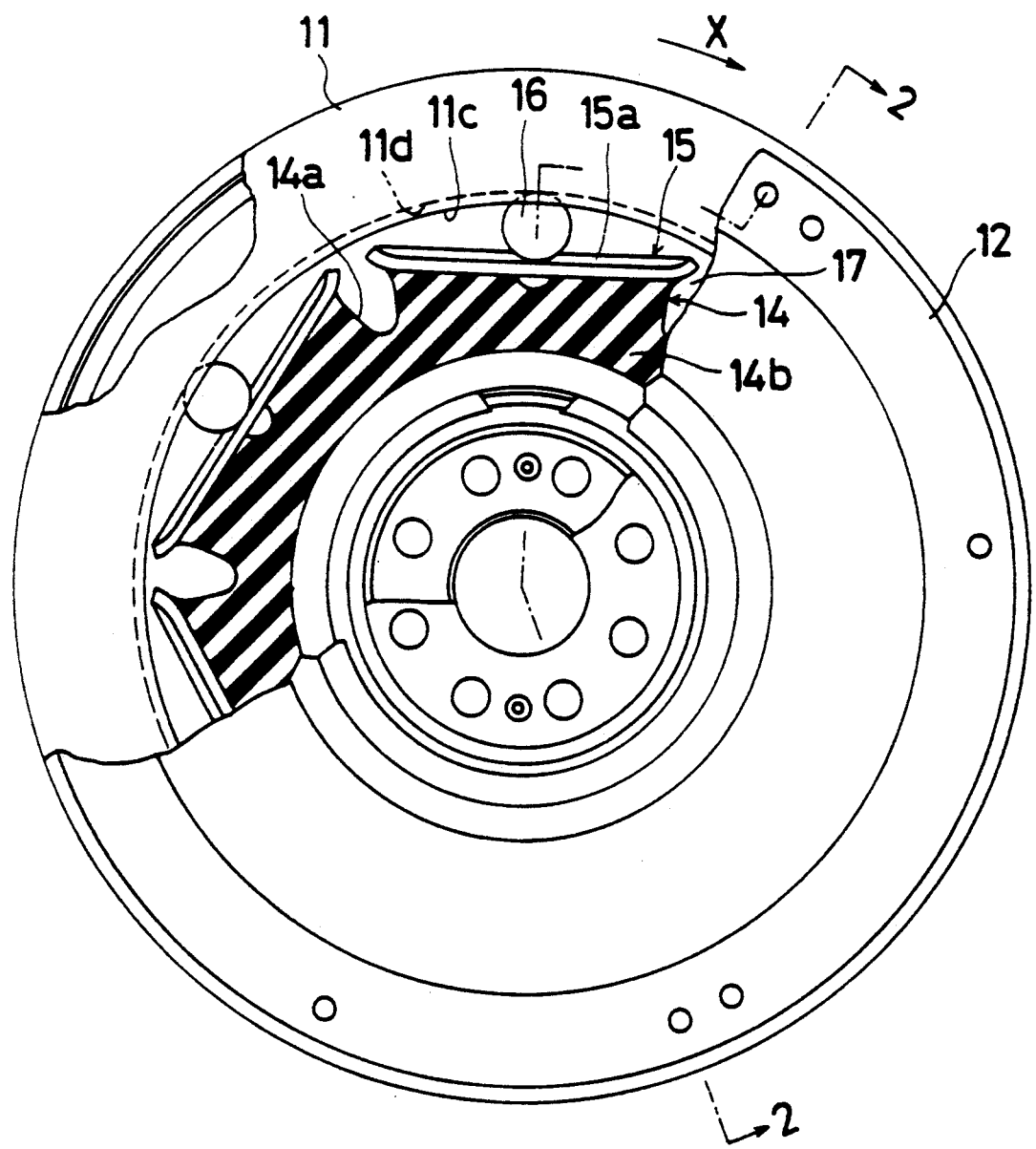
FIG. 1 is a front view, partly shown in section, of the device of the invention.
Figure 2:
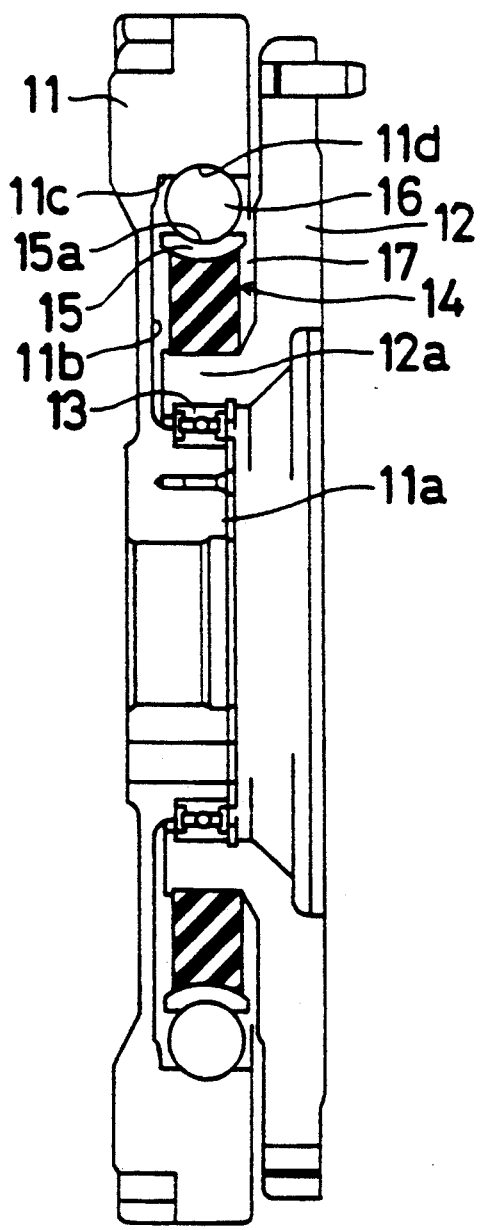
FIG. 2 is a sectional view taken substantially along the line 2—2 in FIG. 1.

Referring to FIG. 1 and FIG. 2, a driving plate 11 is connected to an engine (not shown). A flywheel 12 is connected to a transmission (not shown) through a clutch (not shown). A hub 12a of the flywheel 12 is located at the outer side of a hub 11a of the driving plate 11 through a all bearing 13 along a common axle. Thereby, the flywheel 12 rotates relative to the driving plate 11.

Also, a circular concave portion 11b is formed on the side face of the driving plate 11 at the opposite side of the side face of the flywheel 12. The hub 12a of the flywheel 12 extends into the circular concave portion 11b in the axial direction. Thereby, a space 17 is defined between the outer peripheral surface of the hub 12a and an inner peripheral surface 11c of the driving plate 11. An elastic member 14 made of rubber is disposed in the space 17, the inner peripheral portion of the elastic member 14 is secured to the outer peripheral surface of the hub 12a, the outer peripheral surface of the elastic member 14 is located at the opposite side of the inner peripheral surface 11c of the driving plate 11.

The outer peripheral portion of the elastic member 14 is divided by a plurality of cutouts portions 14a which have equal pitch in the circumferential direction. In the case of this embodiment, the outer peripheral portion of the elastic member 14 is divided into 6 parts, wherein the outer surface of each divided portion 14b is a plain surface which meets at a right angle to the radial direction of this device. Each cutout portion 14a prevents each divided portion 14b of the elastic member 14 from shearing at both ends of the outer surface of each divided portion 14b.

A plate 15 is secured to the outer surface of the divide portion so as to correspond to the inner peripheral surface 11c of the driving plate 11. Thereby, a clearance which is defined between the plate 15 and the inner peripheral surface 11c is the broadest at the center of the plate 15, and becomes narrower as the clearance crosses to each end of the plate 15. Also, the plate 15 is a steel plate. A first groove 15a is formed on the outer surface of the plate 15. A second groove 11d is formed on the inner peripheral surface 11c of the driving plate 11. A plurality of rotational members 16 are rotatably held by the first groove 15a and the second groove 11d in the circumferential direction in such manner that each rotational member 16 is acted upon by the elastic force of each elastic member 14. Therefore, the rotational member 16 is rotated on the first groove 15a according to the relative rotation between the driving plate 11 and the flywheel 12. Also, the rotational member 16 is ball-shaped or roller-shaped.

The shape of the first groove 15a can be modified according to the design concept. Thereby, a torsion-torque characteristic is freely changeable according to the design. Further, both ends of the first groove 15a are positioned closer to the inner peripheral surface 11c of the driven plate 11, than the center of the groove 15c. As a result, the rotational member 16 is prevented from comming off the first groove 15a.

The operation according to the abovementioned embodiment of the invention is described below.

When a torque or a driving force is transmitted from the engine to the driving plate 11, the transmitting torque is applied to the flywheel 12 through the rotational member 16 and the elastic member 14. Also, it is well-known that a torque variation is included in the transmitting torque due to the nature of the engine.

When the transmitting torque produced by an explosive stroke of the engine is transmitted to the driving plate 11, the driving plate 11 is accelerated. Thereby the driving plate 11 rotates relative to the flywheel 12 that tries to maintain a constant speed by inertia of the flywheel 12. In FIG. 1, for instance, when the driving plate 11 begins to rotate relative to the flywheel 12 in the counter-clockwise direction (the arrow X), the rotational member 14 also moves on the plate 15 in the leftward direction with its rotation due to the relative rotation. Namely, the rotational member 16 moves toward the direction along which the clearance between the plate 15 and the inner peripheral surface 11c of the driving plate 11 narrows. Therefore, the rotational member 16 radially compresses the elastic member 14 and transmits the transmitting torque to the flywheel 12. Thus, the transmitting torque is transmitted from the driving plate 11 to the flywheel 12 with a time lag due to the relative rotation. As a result, after the transmitting torque which is transmitted to the driving plate 11 is over or exceeds a maximum torque or a peak torque in the explosive stroke of the engine and the rotational speed of the driving plate 11 begins to decrease, the rotational speed of the flywheel 12 catches up with that of the driving plate 11. Thus, the transmitting torque is transmitted to the flywheel 12 in such a manner that the maximum torque or the peak torque is cut. Also, when the transmitting torque in the opposite direction of that in the explosive stroke of the engine is transmitted to the driving plate 11 in a compressive stroke of the engine, in the same way as mentioned above, (the rotational direction of each part is opposite.) the transmitting torque is transmitted to the flywheel 12 in such a manner that the maximum torque or the peak torque is cut. Consequently, the torque variation can be reduced.

Figure 3:
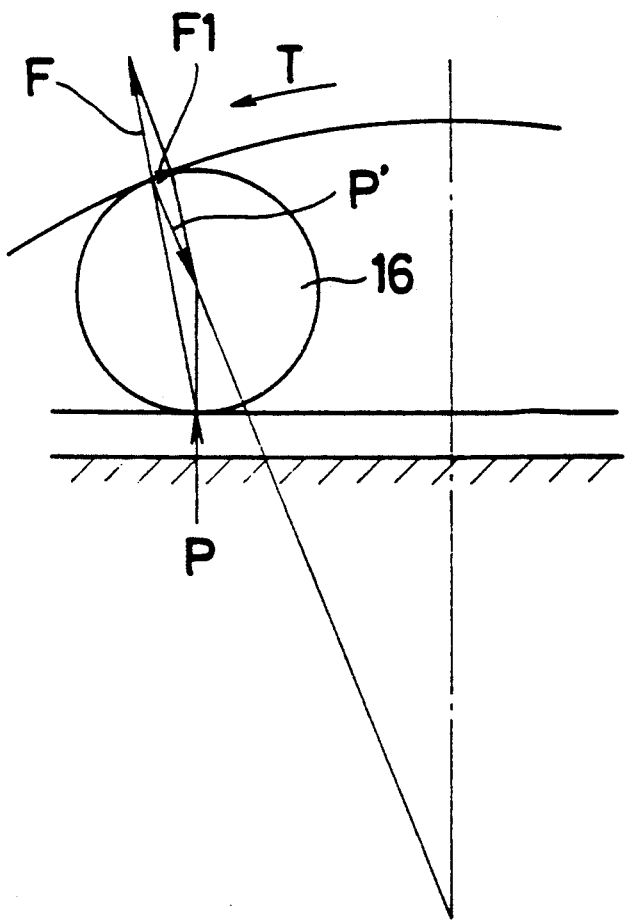
FIG. 3 is a functional view of a rotational member of the invention.
Figure 4:
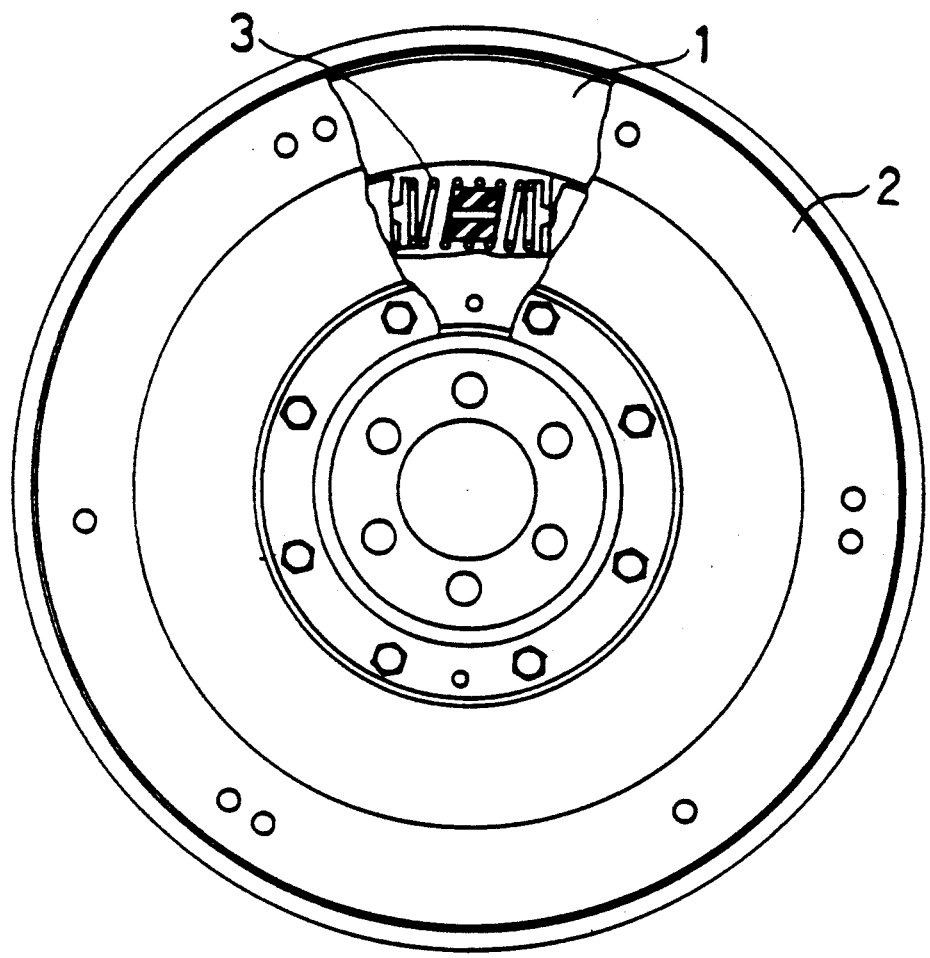
FIG. 4 is a front view, partly shown in section, of the Related Art of the invention.
Figure 5:
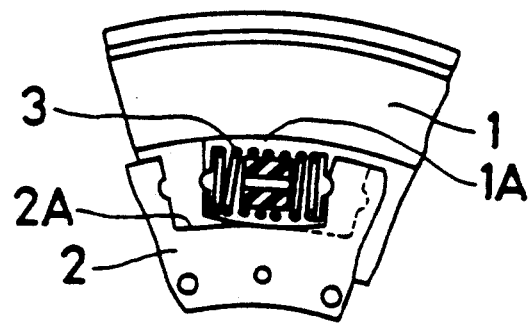
FIG. 5 is an enlarged operational view of a coil spring of FIG. 4.
Figure 6:
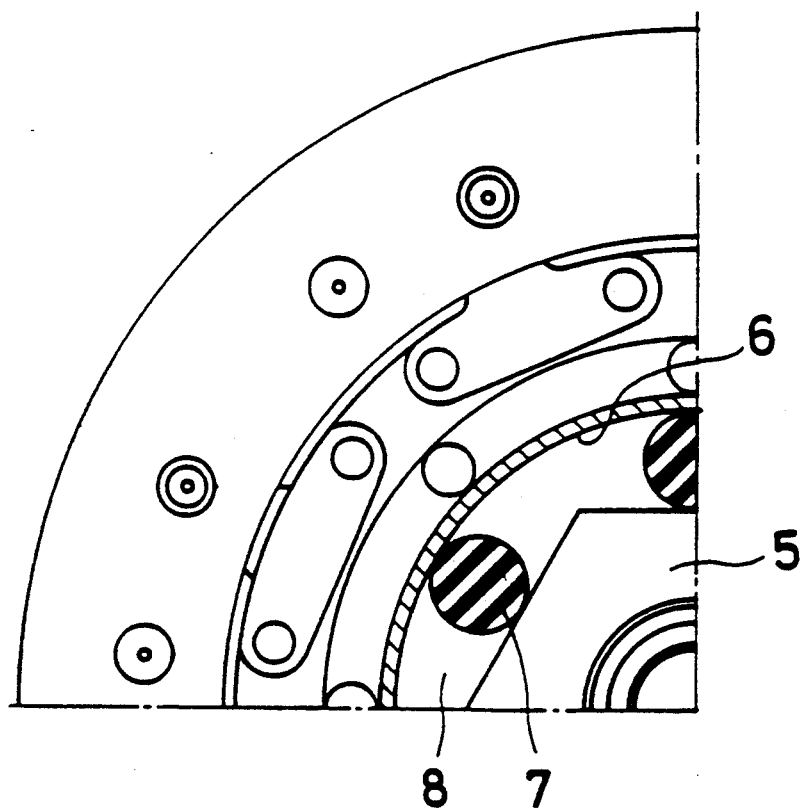
FIG. 6 is an elevational view, partly shown in section, of the another Related Art of the invention.

The torque variation absorbing device of the invention includes a conventional torque limiting mechanism which cuts excessive torque. Namely, when excessive torque is applied to the driving plate 11, the rotational member 16 slips on the plate 15. Therefore, the excessive torque is prevented from being transmitted to the flywheel 12. Thereby, the device is prevented from being damaged. This is explained by the following equations, as shown in FIG. 3, wherein a force P is the depression force of the elastic member 14, a force F is the depression force acting on the rotational member 16 by the force P, a force P' is the reaction force of the force F acting on the rotational member 16, and a force F1 is the resultant from the force p' and the force F. Thereby, when the relation between F1 and p' is defined as a formula of $F1 < \mu P'$ ($\mu$ is a coefficient of friction), the torque is transmitted from the driving plate 11 to the flywheel 12. On the contrary, when the relation between F1 and p' is $F1 \geq \mu P'$, the torque is not transmitted from the driving plate 11 to the flywheel 12 due to the slip of the rotational member 16. Consequently, the torque limiting mechanism of the invention is an extremely simple construction.

As described in the abovementioned embodiment according to the invention, since the rotational member 16 radially compresses the elastic member 14 and transmits the transmitting torque to the flywheel 12, the direction of the depression force acting on the elastic member 14 is always in the same direction. Therefore, the elastic member 14 can transform largely. Thus, the elastic member 14 can transform in response to the amount of the torque even though during the high speed rotation, the elastic member 14 is also excellent in durability.

Moreover, the reaction force of the elastic member 14 is increased by the centrifugal force during high speed rotation. Therefore, the transmitting torque is increased, and the torque transfer efficiency becomes high during high speed rotation. As a result, the high speed performance is improved.

Also, the shape of the first groove 15a is changeable according to the design. Therefore, a torsion-torque characteristic is freely changeable according to the design.

There is not any restrictions in the design in comparison with the conventional elastic member accroding to the coil spring, and the compression force of the elastic member 14 is transformed to the rotational force. Therefore, a large relative angle of torsion is obtained.

The rotational member is constantly attached to the plate 15 and the inner peripheral surface 11c of the driving plate 11 even if the direction indicated by the arrow X of the transmitting torque was changed into the opposite direction. Thereby, the device is prevented from making a noise. Moreover, a simple and low cost device is obtained.

Still, the elastic member may be secured to the driving plate, and the elastic member may be disposed between an inner peripheral surface of the flywheel and the plate which is fixed to the driving plate.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A torque variation absorbing device, comprising:
   a driving plate;
   a flywheel;
   bearing means positioned between a hub of the driving plate and a hub of the flywheel for rotatably supporting the flywheel so that the flywheel is rotatable relative to said driving plate about an axis that is common to said driving plate and said flywheel;
   an elastic member disposed in a space defined between said driving plate and said flywheel, a radially inner peripheral portion of said elastic member being secured to one of said driving plate or said flywheel, and a radially outer peripheral surface of said elastic member facing an inner peripheral surface of the other of said driving plate and said flywheel;
   a receiving plate secured to an outer peripheral surface of said elastic member so as to face said inner peripheral surface, said receiving plate having two oppositely positioned ends that are spaced apart from one another in the circumferential direction of the receiving plate;
   a plurality of rotational members rotatably disposed between said receiving plate and said inner peripheral surface in the circumferential direction, said rotational member being acted upon by the elastic force of said elastic member; and
   a clearance defined between said receiving plate and said inner peripheral surface, said clearance narrowing towards said oppositely positioned ends of the receiving plate from a center of said receiving plate, said elastic member being received in said clearance.

2. A torque variation absorbing device according to claim 1, wherein:
   said receiving plate and said rotational member are made of steel.

3. A torque variation absorbing device according to claim 1, wherein:
   an outer peripheral portion of said elastic member is divided into divided portions by a plurality of cut-out portions equally pitched in the circumferential direction of said elastic member, the outer surface of each divided portion being a plain surface and meeting at a right angle to the radial direction of the device.

4. A torque variation absorbing device according to claim 1, wherein:
   said receiving plate includes a first groove which is formed on the outer surface of said receiving plate.

5. A torque variation absorbing device according to claim 4, wherein:
   said driving plate includes a second groove which is formed on an inner peripheral surface thereof, said rotational member being rotatably held by said first groove and said second groove in the circumferential direction so that said rotational member is acted upon by the elastic force of said elastic member.

6. A torque variation absorbing device according to claim 4, wherein:
   said first groove has oppositely positioned ends and a center, said ends of the first groove being located closer to said inner peripheral surface than the center of the first groove.

* * * * *